United States Patent [19]

Kijima et al.

[11] Patent Number: 5,584,917
[45] Date of Patent: Dec. 17, 1996

[54] WATER REPELLENT FOR WINDOW PANES OF AUTOMOBILES AND METHOD OF REPELLING WATER ON THE WINDOW PANES

[75] Inventors: Tetsuo Kijima, Tokyo; Seigo Shinohara, Kanagawa-ken; Sachiko Yusa, Gunma-ken, all of Japan

[73] Assignees: Taiho Industries Co., Ltd.; Toshiba Silicone Co., Ltd., both of Tokyo, Japan

[21] Appl. No.: 498,474

[22] Filed: Jul. 5, 1995

[30] Foreign Application Priority Data

Jul. 4, 1994 [JP] Japan .................................. 6-152499

[51] Int. Cl.$^6$ ........................................ C09K 3/18
[52] U.S. Cl. ..................... 106/2; 106/287.11; 523/169; 524/236; 524/588
[58] Field of Search ......................... 106/2, 287.11; 523/169; 524/236, 588

[56] References Cited

U.S. PATENT DOCUMENTS

| | | | |
|---|---|---|---|
| 2,947,771 | 8/1960 | Bailey | 106/287.11 |
| 3,579,540 | 5/1971 | Ohlhausen | 523/169 |
| 3,720,699 | 3/1973 | Stoddard | 106/287.11 |
| 3,721,690 | 3/1973 | Maltineiks | 106/2 |
| 3,737,336 | 6/1973 | Golitz et al. | 106/287.11 |
| 3,852,075 | 12/1974 | Basadur | 106/287.11 |
| 3,961,977 | 6/1976 | Koda et al. | 106/287.11 |
| 4,366,001 | 12/1982 | Ona et al. | 106/287.11 |
| 4,388,437 | 6/1983 | Ona | 106/287.11 |
| 4,459,382 | 7/1984 | Ona et al. | 106/287.11 |
| 4,509,981 | 4/1985 | Sanders, Jr. et al. | 106/287.11 |
| 4,844,888 | 7/1989 | Zawadzki | 106/287.11 |
| 4,973,620 | 11/1990 | Ona et al. | 106/287.11 |
| 5,178,668 | 1/1993 | Traver et al. | 106/287.11 |
| 5,183,845 | 2/1993 | Parkinson et al. | 106/287.11 |
| 5,244,598 | 9/1993 | Merrifield et al. | 106/287.11 |
| 5,281,658 | 1/1994 | Ona et al. | 106/287.11 |
| 5,411,585 | 5/1995 | Avery et al. | 106/287.11 |

FOREIGN PATENT DOCUMENTS

| | | | |
|---|---|---|---|
| 50-15473 | 6/1975 | Japan . | |
| 55-9652 | 1/1980 | Japan . | |
| 55-23167 | 2/1980 | Japan . | |
| 55-78080 | 6/1980 | Japan . | |
| 55-90580 | 7/1980 | Japan . | |
| 56-062869 | 5/1981 | Japan | 106/287.11 |
| 5-301742 | 11/1993 | Japan . | |

*Primary Examiner*—Anthony Green
*Attorney, Agent, or Firm*—Browdy and Neimark

[57] ABSTRACT

The water repellent for window panes of automobiles of this invention comprises an amino group-containing polyorganosiloxane having the specific structure, an organic acid, a surfactant and an aqueous solvent, which is usable regardless of whether it is fine or rains, and can provide a uniform film having a good water repellency held for a long period.

15 Claims, No Drawings

WATER REPELLENT FOR WINDOW PANES OF AUTOMOBILES AND METHOD OF REPELLING WATER ON THE WINDOW PANES

BACKGROUND OF THE INVENTION

1. Field of the Invention

This invention relates to a water repellent for window panes of automobiles and a method of repelling water on window panes of automobiles and, more particularly, to a water repellent for window panes of automobiles, which can be properly used in the rain and can form a uniform film having an excellent repellency and durability of repellency on the panes, and a simple method of repelling water on window panes of automobiles by providing the panes with water repellency through an easy operation.

2. Description of Related Art

Hitherto, a treating agent mainly comprised of a surfactant has been used in combination with a mechanical water droplets-repelling means such as a wiper, in order to eliminate glare by an oil film or poor visibility by a non-uniform water film, which is formed in the rain on window panes of automobiles. The thus used treating agent is in general called a "treating agent of a hydrophilic type".

However, when glass panes are treated with a prior art treating agent of a hydrophilic type, there is a problem that no good visibility can be secured in the panes, because images through the panes are warped by unevenness in a thickness of water film on the panes caused by wind pressure when automobiles run, particularly at a high speed in the rain. Furthermore, there is also a problem that the treating agent-coating effect is not durable for a long period not only when automobiles run at a high speed.

On the other hand, there have been proposed some methods of securing good visibility by treating window panes to provide the surface of the panes with water repellency, so that rain droplets are prevented from adhering onto the panes when the droplets come in contact with the surface of the panes. Treating agents used in these proposed methods are called of a hydrophobic type. As the treating agent of a hydrophobic type are known, for example, a water-repelling agent comprising an alkyl polysiloxane and an acid (JP-B-50-15473), an water-repelling agent comprising a siloxane oligomer, organic solvent and metal halide (JP-A-55-9652), a water-repelling agent comprising a chlorine atom-containing siloxane compound (JP-A-55-23167), JP-A-55-78080 and JP-A-55-90580), a water-repelling agent for window panes of automobiles containing an amino-modified silicone oil and a surfactant (JP-A-5-301742).

However, the water-repelling agent comprising an alkyl polysiloxane and an acid, the water-repelling agent comprising a siloxane oligomer, an organic solvent and metal halide and the water-repelling agent comprising a chlorine atom-containing siloxane compound are in general of an organic solvent type. These agents can provide excellent water repellency only when coated on glass panes in a dry state. Treatment with these agents requires such a complicated working process that the agents are coated on panes and then wiped off with a dry waste cloth or the panes are polished. Furthermore, the water-repelling agent comprising a chlorine-containing siloxane compound has a problem that it is poor in stability when stored.

Since the water-repelling agent comprising an amino-modified silicone oil and a surfactant is of an aqueous solution type, it may be used in the rain with insufficient durability and uneven effect of water repellency, partial glare and poor visibility by water droplets.

This invention has been attained under the circumstances above.

SUMMARY OF THE INVENTION

An object of this invention is to solve the problems mentioned above.

Another object of this invention is to provide a water repellent for window panes of automobiles, which can be properly used in the rain and can form a uniform film having an excellent repellency and durability of repellency on the panes.

A still further object of this invention is to provide a simple method of repelling water on window panes of automobiles by providing the panes with water repellency through an easy operation.

According to this invention, there are provided a water repellent for window panes of automobiles, comprising an amino group-containing polyorganosiloxane having the specified structure, organic acid, surfactant and aqueous solvent and a method of repelling water on window panes of automobiles by spraying the water repellent in a continuous layer onto the window panes and then allowing the water repellent to flow down over the panes. The water repellent of this invention can be suitably used regardless of the surface of the window panes being dried or wetted with water droplets.

DESCRIPTION OF PREFERRED EMBODIMENTS

The water repellent for window panes of automobiles of this invention is comprised of an amino group-containing polyorganosiloxane having a specified structure, organic acid, surfactant and aqueous solvent.

Amino Group-Containing Polyorganosiloxane

The amino group-containing polyorganosiloxane of this invention (hereinafter often referred to as component (A)) is represented by the formula (1):

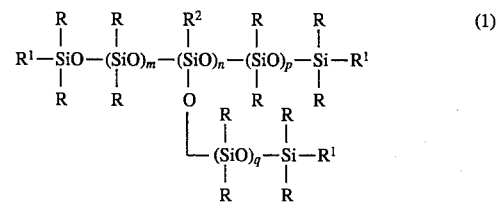

wherein R is a monovalent hydrocarbyl group having a carbon number of 1 to 20; $R^1$ is hydroxyl group or an alkoxy group having a carbon number of 1 to 6; $R^2$ is a substituent represented by the general formula (2):

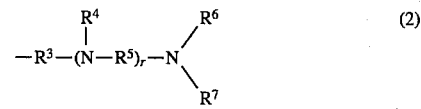

wherein each of $R^3$ and $R^5$ is a divalent hydrocarbyl group having a carbon number of 1 to 6 and each of $R^4$, $R^6$ and $R^7$ is a monovalent hydrocarbyl group having a carbon number of 1 to 20, r is an integer of 0 to 3, $R^3$ and $R^5$ may be identical with or different from each other, and $R^4$, $R^6$ and $R^7$ may be identical with or different from each other; each of m, p and q is an integer of 0 to 20; n is an integer of 1 to 20; and m, n, p and q meet $1 \leq m+n+p+q \leq 60$; each R may be identical with or different from each other; and each $R^1$ may also be identical with or different from each other.

In a preferred embodiment, m is in the range of 10–15, n is in the range of 1–2, and p and q are in the range of 10–15.

The example of R of the general formula (1) may include an alkyl group such as methyl group, ethyl group, propyl group, isopropyl group, butyl group, hexyl group, heptyl group, octyl group, decyl group, dodecyl group, a cycloalkyl group such as cyclohexyl group and cyclooctyl group, and an aryl group such as phenyl group and tolyl group, and an alkenyl group such as vinyl group, allyl group and propenyl group. Of these groups are preferred the alkyl group and aryl group because of their good repellency. Particularly, a lower alkyl group and phenyl group having a carbon number of 1–5, e.g., methyl group and phenyl group are preferred. In the lower alkyl group, R may be different from each other, for example, one of R may be an aryl group and the other an alkyl group.

The example of $R^1$ of the general formula (1) may include hydroxyl group, methoxyl group, ethoxyl group, propoxyl group, isopropoxyl group, butoxyl group, t-butoxyl group, etc. Of these groups are preferred hydroxyl group and a lower alkoxyl group having a carbon number of 1–5 for the reason that these groups provide an excellent water repellency, particularly methoxyl group and ethoxyl group are preferred. When $R^1$ is methoxyl or ethoxyl group, greater advantages can be obtained. Three groups of $R^1$ in a molecule may be identical with or different from each other. All groups of $R^1$ are preferably the same.

The examples of $R^3$ and $R^5$ of the general formula (2) may be various divalent hydrocarbyl groups having a carbon number of 1 to 6, represented by the general formula (3):

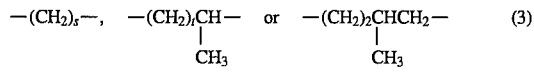

wherein s is an integer of 1 to 6, preferably 2 to 3, and t is 1 to 3.

The examples of $R^4$, $R^6$ and $R^7$ may be hydrogen atom, and various alkyl groups, cycloalkyl groups, aryl groups or alkenyl groups. Of these groups is preferred hydrogen atom, because it makes it possible to hold the repellency for a long period of time.

The example of the substitute represented by the general formula (2) may be aminomethyl group, β-aminoethyl group, γ-aminopropyl group, β-aminobutyl group, N-(β-aminoethyl)aminomethyl group, and γ-(N-(β-aminoethyl)amino)propyl group. Therefore, the amino group-containing organosiloxane having the substitutes may preferably be used.

The viscosity at 25° C. of the amino group-containing polyorganosiloxane of this invention is normally 10–1,000 cP, preferably 15–500 cP, particularly preferably 20–100 cP. If the viscosity is in this range, the amino group-containing polyorganosiloxane can be uniformly applied onto a wetted glass pane in the rain, because it is miscible with rain droplets on the glass pane. If the viscosity is less than 10 cP, then the degree of hydrophilicity is excessively large, so that the polyorganosiloxane may be allowed to flow away together with water droplets, and a uniform film of the polyorganosiloxane may hardly be formed in the case where an amount of rain is large. If the viscosity exceeds 1,000 cP, on the other hand, the miscibility with water droplets may be reduced, so that it may hardly spread on a glass pane. This may cause glare of the glass pane. However, there occurs no such inconvenience when the glass pane is in a dry state.

The amino group-containing polyorganopolysiloxane is normally in the range of 0.1–25% by weight, preferably 0.5–20% by weight of the total amount of the water repellent for window glass panes.

Organic Acid

In this invention, various organic acids (hereinafter often referred to as component (B)) may be used without any limitations. For example, carboxyl acid, sulfonic acid, sulfinic acid, etc. may suitably be used. These organic acids may be used singly or in combination. In one use embodiment, two or three acids of carboxyl acid, sulfonic acid and sulfinic acid may be used in combination. Of these acids is preferred carboxyl acid.

As the carboxyl acid reference may be made to a monovalent carboxylic acid such as formic acid, acetic acid, propionic acid, n-butyric acid, isobutyric acid, pivalic acid, valeric acid, isovaleric acid, hexanoic acid, 2-ethylbutyric acid, capric acid, oleic acid and lauric acid, divalent carboxylic acid such as oxalic acid, malonic acid, succinic acid, glutaric acid, adipic acid, maleic acid and fumaric acid, or an oxycarboxylic acid such as glycolic acid, lactic acid, malic acid, tartaric acid, gluconic acid and succinic acid, and an aromatic carboxylic acid containing an aromatic ring, e.g., benzene ring, such as phthalic acid, benzoic acid and salicylic acid.

In this invention, one or more of the carboxylic acids may be used singly or in combination.

Of the organic carboxylic acids mentioned above are preferred a monovalent aliphatic carboxylic acid represented by the formula of $R^8COOH$, wherein $R^8$ is hydrogen atom or a saturated or unsaturated aliphatic group, which may contain hydroxyl group, having a carbon number of 1–17, preferably 1–10, more preferably 1–5; a divalent aliphatic acid represented by the formula of $HOOCR^9COOH$, wherein $R^9$ is an saturated or unsaturated divalent aliphatic group having a carbon number of 1–8, preferably 1–4, and may contain hydroxyl group; and an aromatic carboxylic acid.

Alternatively speaking, the organic carboxylic acid suitably used in this invention may include a saturated aliphatic monocarboxylic acid, saturated aliphatic hydroxycarboxylic acid, saturated aliphatic dicarboxylic acid, aromatic hydroxycarboxylic acid, etc.

In another expression, the organocarboxylic acid suitably used in this invention may include acetic acid, lactic acid, succinic acid and salicylic acid.

In any rate, in this invention, one or more of organic acids such as organocarboxylic acids, may be used singly or in combination.

The amount of the component (B) mixed in this invention is not particularly limited, but preferably in the range of 1–50 parts by weight, particularly preferably 5–20 parts by weight per 100 parts by weight of component (A). The amount of component (B) in the above-mentioned range can advantageously hold the excellent water repellency for a long period of time. In other words, the amount in the above-mentioned range is preferred for the reason that it provide the durable or stable water repellency. Excellent handling and coating properties are provided by the component B in the above-mentioned range in cooperation with the other components. If the water repellent containing an amount of the component (B) exceeding 50 parts by weight, it may unpreferably irritate the skin and damage coatings of automobiles.

Furthermore, the amount of the component (B) is normally in the range of 0.001–13% by weight, preferably 0.005–5% by weight, based on the total weight of the water repellent for window panes.

Surfactant

The surfactant (hereinafter referred to as component (C)) used in this invention is not particularly limited and may be any of an anionic, cationic, nonionic and amphoteric surfactant. Of these surfactants are preferred the cationic or nonionic surfactant, particularly preferred the nonionic surfactant.

As the cationic surfactant reference may preferably be made to a quaternary ammonium hydroxide such as octyltrimethyl ammonium hydroxide, dodecyltrimethyl ammonium hydroxide, hexadecyltrimethyl ammonium hydroxide, octyldimethylbenzyl ammonium hydroxide, decyldimethylbenzyl ammonium hydroxide, dioctadecyldimethyl ammonium hydroxide, tallow trimethyl ammonium hydroxide, coconut oil trimethyl ammonium hydroxide, octadecyl ammonium hydroxide, polyoxyethyleneoctyl ammonium hydroxide, etc. and salts of hydrochloric acid and acetic acid thereof. These may be used singly or in combination.

As the nonionic surfactant reference may preferably be made to a polyoxyethylene alkyl ether such as polyoxyethylene lauryl ether, polyoxyethylene tridecyl ether, polyoxyethylene cetyl ether, polyoxyethylene stearyl ether, polyoxyethylene oleyl ether, etc.; a polyoxyethylene alkylaryl ether such as polyoxyethylene nonylphenyl ether, polyoxyethylene octylphenyl ether, polyoxyethylene dodecylphenyl ether, etc.; a polyoxyalkylene sorbitan aliphatic ester; a polyoxyalkylene glycerin aliphatic ester; a polyethylene glycol aliphatic ester; polyoxyethylene hardened castor oil; a sorbitan aliphatic ester; a glycerin aliphatic ester; a polyglycerin aliphatic ester; a sucrose aliphatic ester; an alkylamine carboxylate; etc. These surfactants may be used singly or in combination. Of these surfactants are particularly preferred an polyoxyalkylene alkyl ether, polyoxyalkylene sorbitan aliphatic ester, polyoxyethylene alkylaryl ether, polyethyleneglycol aliphatic ester and alkylamine carboxylate. In this invention, one or more of these surfactants may be used singly or in combination.

The amount of the component (C) mixed in this invention is not particularly limited, but is preferably in the range of 0.01–50 parts by weight, more preferably 0.1–30 parts by weight per 100 parts by weight of the component (A). If the amount of the component (C) is in the above-mentioned range, then the water repellency is highly stable and the components are not separated when stored. Furthermore, the component (C) gives the water repellent good compatibility with the surface of glass pane when used in the rain, so that a uniform film of the water repellent having an excellent water repellency can be formed on glass panes. If the amount is excessively larger or smaller, the repellency of the film unpreferably becomes poor.

Furthermore, the amount of the component (C) is normally in the range of 0.001–15% by weight, preferably 0.01–8% by weight, based on the total weight of the water repellent for window panes.

Aqueous Solvent

An aqueous solvent (hereinafter referred to as component (D)) used in this invention is water and/or an aqueous organic solvent.

As the aqueous organic solvent reference may preferably be made to a monohydric or polyhydric alcohol such as methanol, ethanol, 2-propanol, ethylene glycol, propylene glycol, glycerin, etc.; a glycol ether such as ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol methyl ether, diethylene glycol ethyl ether, diethylene glycol butyl ether, dipropylene glycol methyl ether, tripropylene glycol methyl ether, 3-methyl-3-methoxybutanol, etc.; an acetate such as ethylene glycol methyl ether acetate, ethylene glycol ethyl ether acetate, propylene glycol methyl ether acetate, propylene glycol methyl ether acetate, 3-methyl-3-methoxybutyl acetate, etc.; and an alkanolamine such as triethanolamine, 2-(dimethylamino)ethanol, 2-(diethylamino)ethanol, etc.

Furthermore, an organic solvent which is miscible with or soluble in water in a relatively optional ratio, for example, ketones, ethers, etc. may be used. As the ketones reference may be made to dimethyl ketone, diethyl ketone, methylethyl ketone, etc. As the ethers reference may be made to dioxane, tetrahydrofuran, etc.

As the aqueous solvent are preferred water, an alcohol having a carbon number of 1–5, or glycol ether.

In this invention, water or any of the aqueous organic solvents may be used as the component (D) singly, or water and any of the aqueous organic solvent may be combined. In any case, one or more of these aqueous organic solvents may be used singly or in combination.

The amount of the component (D) mixed in this invention is not particularly limited, but preferably in the range of 500–20,000 parts by weight, particularly preferably 1,000–5,000 parts by weight per 100 parts by weight of the component (A). If the amount of the component (D) is in the above-mentioned range, then the water repellent can easily be coated or sprayed onto glass surfaces to form a film having an excellent water repellency.

Furthermore, the amount of the component (B) is normally in the range of 65–99.5% by weight, preferably 75–99% by weight, based on the total weight of the water repellent for window panes.

Other Components

The water repellent for window panes of automobiles according to this invention can have an excellent water repellency or other technical advantages when it contains the components (A), (B), (C) and (D). However, this water repellent may contain other components, if desired, and as far as the advantages of this invention are not damaged by the other components.

As such component (D) the water repellent of this invention may contain perfumes, preservatives, light stabilizers, rust preventives, ultraviolet-ray absorbents, etc.

The perfumes may be natural or synthetic and animal or botanic.

As the animal perfumes reference may be made to, for example, musk, civet, castor, ambergris, etc. and as the botanic perfumes reference may be made to, for example, an essential oil such as peppermint oil, lemon oil, rose oil, etc.; an absolute such as vanilla absolute, perublossom absolute; a resinoid such as benzoin resinoid, olibanum resinoid, etc.; an oleoregin such as vanilla orange, ginger orange, etc.; a tincture such as vanilla tincture, musk tincture, etc.; a balsam such as perubalsam, tolubalsam, etc.; and a concrete such as rose concrete, orris concrete, etc.

The synthetic perfumes are obtained by reaction of petroleum, coal, natural gas, fat and oil, etc. As the synthetic perfumes reference may be made to a floral perfume such as acetophenone, a pineapple perfume such as ethyl caproate or butylbutyrate, a jasmine perfume such as benzyl acetate or methyldihydrojasmonate, a banana perfume such as butyl acetate, a green perfume such as allylamyl glycolate, a rose perfume such as citronellol, citronellyl acetate or β-phenylethyl alcohol, a strawberry perfume such as ethylmethylphenyl glycidate, a vanilla perfume such as vanillin or ethyl vanillin, a peach perfume such as γ-undecalactone, a coconut perfume such as nonalactone, or an apple perfume such as isoamyl valerate.

As the preservative reference may be made to, for example, p-hydroxybenzoic acid, benzoic acid, sorbic acid, dehydroacetic acid, formic acid, salicylic acid, boric acid, vanillin, p- or o-chlorobenzoic acid, propionic acid, sulfurous acid, trichlorophenylacetic acid, p-hydroxyalkyl benzoate, benzetonium chloride, benzalconium chloride, cetyltrimethyl ammonium, cetylpyridium chloride, dimethyldidodecylcenyl ammonium, tetramethylthiuram disulfide, vanillin, ethylvanillin, phenol cresol, chlorothymol, methylchlorothymol, ethylchlorothymol, chlorobutanol, o-phenylphenol, dichlorophen, p-chloro-m-xylenol, p-chloro-m-cresol, dichloro-m-xylenol, pentachlorophenol, p-chloro-m-xylenol, N,N-dimethyl-N'-phenyl-sulfamide, etc.

Preparing Method

The water repellent for window panes of automobiles according to this invention is prepared by mixing the components (A), (B), (C) and (D) mentioned above and, if necessary, the other components mentioned above may be added.

Mixing is not particularly limited and may be carried out by an apparatus such as an agitator, colloid mill, homomixer, homogenizer, combimix, sand grinder, etc. The mixing may be carried out by one or more of the apparatuses and further may be carried out at a normal temperature and under heat.

Water Repelling Method

The water repelling method of this invention comprises spraying the water repellent onto a window pane to form a continuous layer of the water repellent on the window pane and then it is important to allow the water repellent to flow down over the surface of the window pane. Furthermore, in the water repelling method of this invention, it is important that the sprayed water repellent-flowing down window pane is left to stand without post-treatments such as wiping or drying of the repellent.

In the water-repelling method of this invention, the water repellent is preferably used.

The water repellent for window panes of automobiles according to this invention can properly be used regardless of the surface of the window pane being in a dry state, and can form a film having an excellent water repellency, good durability and high stability on the window pane.

The water repellent for window panes of automobiles according to this invention may be used in its own concentration or in a form diluted with water or a window washer liquid.

In general, the concentration of component (A), i.e., the amino group-containing polyorganosiloxane is preferably in the range of 0.01–20% by weight, particularly 0.1–10% by weight, when used.

In the method of forming a film of the water repellent for window panes of automobiles according to this invention, which is not particularly limited, the water repellent in a spray or aerosol form may be sprayed by a hand sprayer, or may be coated by a brush or cloth. In the case where the water repellent is to be used for window panes of automobiles, the water repellent may be used in place of a window washer liquid or added to the window washer liquid and sprayed together with the window washer liquid through a window washer liquid-jetting nozzle.

The water repellent for window panes of automobiles according to this invention can suitably be used on window panes having water droplets retained thereon by car washing or in the rain. That is, the water repellent of this invention can be formed in a film and have an excellent durability and stability of water repellency, even when wetted.

This invention will be illustrated below with reference to some examples. However, this invention should not be limited by these examples.

EXAMPLES 1–5

In each of the examples, the components indicated below were combined in the ratio indicated below. These components were homogeneously mixed by a homogenizer to obtain a water repellent. The resultant water repellent was evaluated for water repellency when used in a dry state, and water repellency when used in the presence of water droplets. The results of this evaluation are shown in Table 1.

[Initial Water Repellency When Used in a Dry State]

The obtained water repellent was coated by a tissue paper on a surface of glass. The coated glass was left to stand at room temperature for 1 hour. Then, the glass was twice slightly wiped by a tissue paper to remove water on the glass. The thus treated surface of glass was allowed to be in contact with distilled water for measurement the angle of contact. The larger the angle of contact, the better the water repellency.

[Uniformity of Water Repellency When Used in the Presence of Water Droplets]

The obtained water repellent was sprayed by a hand sprayer over the whole surface of a front pane of an automobile while showering. The showering was continued while operating a wiper. Water droplets formed on the surface of the front pane were observed. The uniformity was evaluated in the following criteria:

○: Shape of the water droplets was almost spherical over substantially the whole surface of the front pane;

Δ: Shape of the water droplets was varied, and water repellency was poor in places; and X: Water droplets were spread and no water repellency was recognized in places.

[Durability of Water Repellency When Used in the Presence of Water Droplets]

The obtained water repellent was sprayed by a hand sprayer over the whole surface of a front pane of an automobile while showering. The showering was continued while operating a wiper. The shape of water droplets formed over the whole glass surface was observed by eyes immediately after the spraying and in 2 hours and 6 hours after the spraying. The water repellency was evaluated in the following criteria:

○: Shape of the water droplets was almost spherical, and good water repellency was obtained;

Δ: Shape of the water droplets was varied, and water repellency was poor; and

X: Water droplets were spread and no water repellency was recognized.

Components of Water Repellent and Contents Thereof in Each of Examples 1–5

The "percentages" and "parts" used in the examples are on a weight basis.

Example 1

| Component (A): | amino group-containing polysiloxane A-1 (viscosity at 25° C.: 100 cP) | 5.0% (100 parts) |
|---|---|---|
| Component (B): | acetic acid | 0.3% (6 parts) |
| Component (C): | polyoxyethylene(7) lauryl ether | 0.5% (10 parts) |
| Component (D): | water | 80.0% (1600 parts) |
| | glycerin | 14.2% (284 parts) |

Example 2

| Component (A): | amino group-containing | 5.0% 100 parts |

-continued

| | polysiloxane A-1 | |
|---|---|---|
| Component (B): | lactic acid | 0.3% (6 parts) |
| Component (C): | polyoxyethylene(10) stearyl ether | 0.5% (10 parts) |
| | polyoxyethylene(20) sorbitan monooleate | 0.5% (10 parts) |
| Component (D): | isopropyl alcohol | 93.7% (1874 parts) |
| Example 3 | | |
| Component (A): | amino group-containing polysiloxane A-2 (viscosity at 25° C.: 50 cP) | 5.0% (100 parts) |
| Component (B): | succinic acid | 0.3% (6 parts) |
| Component (C): | polyoxyethylene(8) octylphenyl ether | 0.5% (10 parts) |
| | polyoxyethylene(20) glyceryl trioleate | 0.5% (10 parts) |
| Component (D): | ethyl alcohol | 93.7% (1874 parts) |
| Example 4 | | |
| Component (A): | amino group-containing polysiloxane A-1 | 5.0% (100 parts) |
| Component (B): | salicylic acid | 0.3% (6 parts) |
| Component (C): | polyoxyethylene(15) nonyl phenyl ether | 0.5% (10 parts) |
| Component (D): | water | 80.0% (1600 parts) |
| | ethylene glycol monobutyl ether | 14.2% (284 parts) |
| Example 5 | | |
| Component (A): | amino group-containing polysiloxane A-1 | 5.0% (100 parts) |
| Component (B): | acetic acid | 0.3% (6 parts) |
| Component (C): | octadecylamineacetate | 0.5% (10 parts) |
| Component (D): | water | 80.0% (1600 parts) |
| | glycerin | 14.2% (284 parts) |

The amino group-containing polysiloxane used in Examples 1–5 had a structure represented by the formula of Amino group-containing polysiloxane A-1

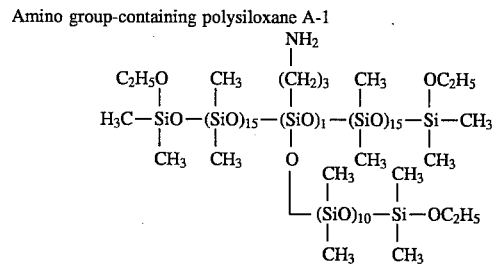

Amino group-containing polysiloxane A-2

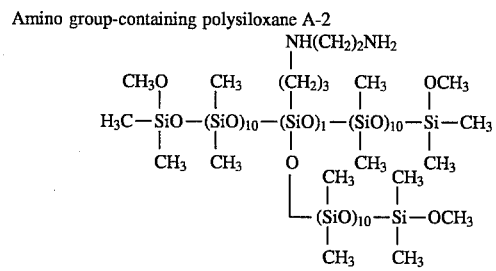

Comparative Example 1

A water repellent was prepared in the same manner as in Example 1, except that no acetic acid was contained. The resultant water repellent was evaluated in the same manner as in Example 1. The results are shown in Table 1.

Comparative Examples 2–5

Water repellents were prepared in the same manner as in Example 1, except that in Comparative Example 2, amino group-containing polysiloxane A-3 (viscosity at 25° C.: 100 cP) was used in place of the amino group-containing polysiloxane A-1 in Example 1, and in Comparative Examples 3, 4 and 5, amino group-containing polysiloxane A-4 (viscosity at 25° C.: 1,000 cP), amino group-containing polysiloxane A-5 (viscosity at 25° C.: 50 cP) and amino group-containing polysiloxane A-6 (viscosity at 25° C.: 50 cP) was used, respectively, in place of the amino group-containing polysiloxane A-1 in Example 1. The resultant water repellents were evaluated in the same manner as in Example 1. The results are shown in Table 1.

The amino group-containing polysiloxane used in Examples 1–5 had a structure represented by the formula of Amino group-containing polysiloxane A-3

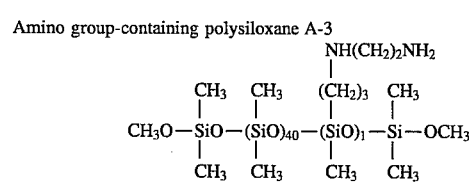

Amino group-containing polysiloxane A-4

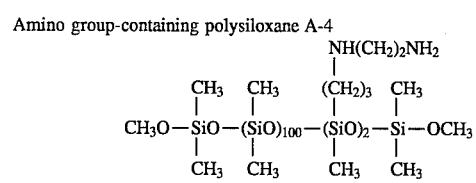

Amino group-containing polysiloxane A-5

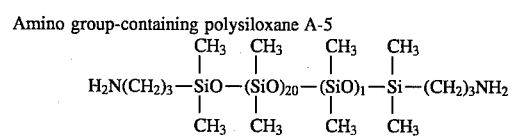

Amino group-containing polysiloxane A-6

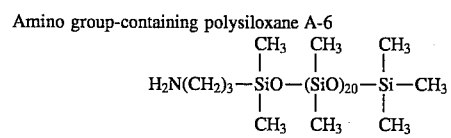

Comparative Example 6

A water repellent was prepared in the same manner as in Example 1, except that hydrochloric acid was used in place of acetic acid, and the resultant water repellent was evaluated in the same manner as in Example 1. The results are shown in Table 1.

Comparative Example 7

A water repellent was prepared in the same manner as in Example 1, except that polyoxyethylene(7)lauryl ether was not used, and the resultant water repellent was evaluated in the same manner as in Example 1. The results are shown in Table 1.

Comparative Example 8

A water repellent was prepared in the same manner as in Example 4, except that polyoxyethylene(15)nonyl phenyl was used in an amount of 0.03%, and the resultant water repellent was evaluated in the same manner as in Example 1. The results are shown in Table 1.

TABLE 1

|  | Examples |  |  |  |  |
|---|---|---|---|---|---|
|  | 1 | 2 | 3 | 4 | 5 |
| Water repellency (degree) (treated in a dry state) | 102 | 103 | 102 | 102 | 100 |
| Water repellency and uniformity (while showering) | O | O | O | O | O |
| Water repellency and durability |  |  |  |  |  |
| directly after | O | O | O | O | O |
| in 2 hours | O | O | O | O | Δ |
| in 6 hours | O | O | O | Δ | Δ |

|  | Comparative Examples |  |  |  |  |  |  |  |
|---|---|---|---|---|---|---|---|---|
|  | 1 | 2 | 3 | 4 | 5 | 6 | 7 | 8 |
|  | 102 | 98 | 101 | 78 | 80 | 98 | 101 | 102 |
|  | O | O | O | Δ | Δ | O | X | Δ |
|  | O | O | O | Δ | Δ | O | X[1)] | Δ |
|  | X | Δ | Δ | Δ | Δ | Δ | X | Δ |
|  | X | X | X | X | X | X | X | Δ |

Note: [1)]There was a great difference between water-repelled portions and non-repelled portions.

ADVANTAGES OF THE INVENTION

According to this invention, there can be provided a water repellent for window panes of automobiles, which can be properly used in the rain and can form a uniform film having an excellent repellency and stability or durability of repellency on the panes.

According to this invention, there can be provided a water repellent for window panes of automobiles, which is extendable even when the panes are wetted, and can form a uniform film having an excellent repellency and stability or durability of repellency on the panes.

According to this invention, there can be provided a water repellent for window panes of automobiles, which can be properly used in the rain, and can rapidly secure a broad field of view free of glare and distortion even when it suddenly begins to rain.

The water repellent for window panes of automobiles of this invention is always excellent in handling as well as in the rain, because it is an aqueous solvent-base repellent. Furthermore, it can more safely be stored and used than an organic solvent-base repellent.

According to this invention, there can be provided a method of repelling water on window panes of automobiles without any post-treatment, particularly wiping-off.

What is claimed is:

1. A water repellent for window panes of automobiles, which comprises
   at least one amino group-containing polyorganosiloxane represented by the general formula (1):

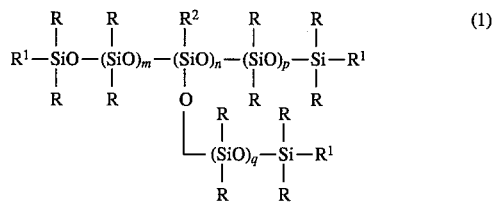

wherein R is a monovalent hydrocarbyl group having a carbon number of 1 to 20; $R^1$ is hydroxyl group or an alkoxy group having a carbon number of 1 to 6; $R^2$ is a substituent represented by the general formula (2):

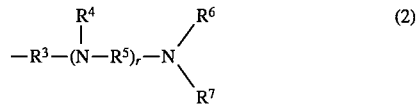

wherein each of $R^3$ and $R^5$ is a divalent hydrocarbyl group having a carbon number of 1 to 6 and each of $R^4$, $R^6$ and $R^7$ is a monovalent hydrocarbyl group having a carbon number of 1 to 20, r is an integer of 0 to 3, $R^3$ and $R^5$ may be identical with or different from each other, and $R^4$, $R^6$ and $R^7$ may be identical with or different from each other; each of m, p and q is an integer of 0 to 20; n is an integer of 1 to 20; and m, n, p and q meet $1 \leq m+n+p+q \leq 60$; each R may be identical with or different from each other; and each $R^1$ may also be identical with or different from each other, 1–20 parts by weight, based on 100 parts by weight of said polyorganosiloxane, of at least one organic acid, 0.1 to 50 parts by weight, based on 100 parts by weight of said polyorganosiloxane, of at least one surfactant and 1,000 to 20,000 parts by weight, based on 100 parts by weight of said polyorganosiloxane, of at least one aqueous solvent.

2. A water repellent for window panes of automobiles according to claim 1, wherein the amino group-containing polyorganosiloxane has a viscosity at 25° C. of 10–1,000 cP.

3. A water repellent for window panes of automobiles according to claim 1, wherein the aqueous solvent contains at least one selected from the group consisting of water and water-soluble organic solvents.

4. A water repellent according to claim 1, wherein said at least one organic acid is selected from the group consisting of at least one carboxylic acid, at least one sulfonic acid, at least one sulfinic acid, and mixtures thereof; said at least one surfactant is selected from the group consisting of at least one anionic surfactant, at least one cationic surfactant, at least one non-ionic surfactant, at least one amphoteric surfactant, and mixtures thereof; and said at least one aqueous solvent is selected from the group consisting of water, at least one aqueous organic solvent, and mixtures thereof.

5. A method of repelling water on window panes, which comprises coating the window panes with the water repellent for window panes of automobiles claimed in claim 1, and not conducting any post-treatment.

6. A method of repelling water on window panes which comprises coating wetted window panes with the water repellent for window panes of automobiles claimed in claim 1.

7. A method of repelling water on window panes, which comprises spraying the water repellent for window panes of automobiles claimed in claim 1 onto a a window pane, so that droplets of the water repellent form a continuous layer and then allowing the water repellent to flow down over the window pane.

8. A water pellent for window panes of automobiles according to claim 2, wherein the aqueous solvent contains at least one selected from the group consisting of water and water-soluble organic solvents.

9. A water repellent for window panes of automobiles according to claim 2, wherein the aqueous solvent contains at least one selected from the group consisting of water and water-soluble solvents.

10. A method of repelling water on window panes, which comprises coating the window panes with the water repellent for window panes of automobiles claimed in claim 8, and not conducting any post-treatment.

11. A method of repelling water on window panes, which comprises coating wetted window panes with the water repellent for window panes of automobiles claimed in claim 8.

12. A method of repelling water on window panes, which comprises spraying the water repellent for window panes of automobiles claimed in claim 8, onto a window pane, so that droplets of the water repellent form a continuous layer and then allowing water repellent to flow down over the window panes.

13. A method of repelling water on window panes, which comprises coating the window panes with the water repellent for window panes of automobiles claimed in claim 3, and not conducting any post-treatment.

14. A method of repelling water on window panes, which comprises coating wetted window panes with the water repellent for window panes of automobiles claimed in claim 3.

15. A method of repelling water on window panes, which comprises spraying the water repellent for window panes of automobiles claimed in claim 3, onto a window pane, so that droplets of the water repellent may form a continuous layer and then allowing water repellent to flow down over the window pane.

* * * * *